US008151570B2

(12) United States Patent
Jennings et al.

(10) Patent No.: US 8,151,570 B2
(45) Date of Patent: Apr. 10, 2012

(54) TRANSITION DUCT COOLING FEED TUBES

(75) Inventors: Stephen Jennings, Folsom, CA (US); Peter Stuttaford, Jupiter, FL (US); Stephen W. Jorgensen, Palm City, FL (US)

(73) Assignee: Alstom Technology Ltd (CH)

( * ) Notice: Subject to any disclaimer, the term of this patent is extended or adjusted under 35 U.S.C. 154(b) by 1006 days.

(21) Appl. No.: 11/951,790

(22) Filed: Dec. 6, 2007

(65) Prior Publication Data

US 2009/0145099 A1 Jun. 11, 2009

(51) Int. Cl.
*F02C 1/00* (2006.01)

(52) U.S. Cl. ................. 60/759; 60/752; 60/755; 60/757

(58) Field of Classification Search .................... 60/759, 60/752, 754, 755, 757, 758, 760
See application file for complete search history.

(56) References Cited

U.S. PATENT DOCUMENTS 3,899,882 A * 8/1975 Parker .............................. 60/752
4,054,028 A * 10/1977 Kawaguchi .................. 60/39.23
4,301,657 A * 11/1981 Penny ............................. 60/748
4,339,925 A * 7/1982 Eggmann et al. ............... 60/757
4,422,288 A * 12/1983 Steber ............................. 60/800
4,719,748 A * 1/1988 Davis et al. .................. 60/39.37
5,388,412 A * 2/1995 Schulte-Werning et al. ... 60/760
5,454,221 A * 10/1995 Loprinzo ......................... 60/772
5,488,829 A * 2/1996 Southall et al. ................. 60/725
6,412,268 B1 7/2002 Cromer et al.
6,450,762 B1 9/2002 Munshi
6,484,505 B1 * 11/2002 Brown et al. ................... 60/760
6,494,044 B1 12/2002 Bland
6,769,257 B2 8/2004 Kondo et al.
6,890,148 B2 5/2005 Nordlund
6,931,862 B2 * 8/2005 Harris ............................. 60/804
7,010,921 B2 3/2006 Intile et al.
7,104,065 B2 * 9/2006 Benz et al. ...................... 60/725
7,137,241 B2 * 11/2006 Martling et al. ............. 60/39.37
2002/0112483 A1 8/2002 Kondo et al.
2002/0121744 A1 9/2002 Aksit et al.
2003/0167776 A1 9/2003 Coppola
2004/0037699 A1 2/2004 Frosini et al.
2005/0204741 A1 9/2005 Simons et al.
2005/0268613 A1 12/2005 Intile et al.
2005/0268615 A1 12/2005 Bunker et al.
2005/0279099 A1 12/2005 Zborovsky et al.
2006/0123797 A1 6/2006 Zborovsky et al.
2006/0130484 A1 * 6/2006 Marcum et al. ................. 60/752
2006/0162314 A1 7/2006 Youngblood
2006/0185345 A1 8/2006 Wilson et al.
2006/0288707 A1 12/2006 Weaver et al.
2007/0033941 A1 2/2007 Riggi et al.

* cited by examiner

*Primary Examiner* — William H Rodriguez
*Assistant Examiner* — Young Choi
(74) *Attorney, Agent, or Firm* — Shook Hardy & Bacon LLP

(57) ABSTRACT

Embodiments for an apparatus and associated method for providing a cooling fluid to a gas turbine transition duct in order to lower the effective operating temperatures of the transition duct are disclosed. The transition duct has an inner liner and an impingement sleeve positioned radially outward with a passageway formed therebetween. The impingement sleeve has a plurality of openings where a portion of the openings each have a feed tube extending through the opening and into the passageway. The feed tubes are oriented at an angle relative to the impingement sleeve, such that an inlet to the feed tube is directed generally towards an oncoming flow of cooling fluid. The feed tubes direct a portion of the cooling fluid toward the inner liner and into the passageway for cooling of the transition duct.

13 Claims, 7 Drawing Sheets

TRANSITION DUCT COOLING FEED TUBES

CROSS-REFERENCE TO RELATED APPLICATIONS

Not Applicable.

STATEMENT REGARDING FEDERALLY SPONSORED RESEARCH OR DEVELOPMENT

Not Applicable.

TECHNICAL FIELD

The present invention relates to gas turbine engines. More particularly, embodiments of the present invention relate to an apparatus and method for cooling a transition duct that couples a combustor to a turbine.

BACKGROUND

Gas turbine engines operate to produce mechanical work or thrust. Land-based gas turbine engines typically have a generator coupled thereto that uses the mechanical work to drive an electrical generator. In operation, fuel is directed through one or more fuel nozzles to a combustor where it mixes with compressed air and is ignited to form hot combustion gases. These hot combustion gases then pass to a turbine by way of at least one transition duct. The hot combustion gases drive the turbine, which in turn, drives the compressor.

The transition duct, which can often reach temperatures upwards of approximately 1400 deg. Fahrenheit, directs the hot combustion gases from the combustion section to the turbine. Depending on the type of engine, the combustor may be located radially outward of the turbine and the engine may comprise a plurality of combustors. In this arrangement, the transition duct changes radial position along its length between the combustor and the turbine. Regardless of geometry, the transition duct requires a sufficient amount of cooling to overcome the elevated operating temperatures and maintain metal temperatures of the transition duct such that the base materials can withstand the mechanical and thermal stresses. There is yet another issue with respect to cooling of a plurality of transition ducts that feed the turbine inlet. When multiple transition ducts having impingement sleeves are positioned adjacent to each other, there is often times little space for cooling air to pass between the transition duct impingement sleeves. The smaller space causes the cooling air that does pass between adjacent transition ducts to move at a higher velocity than would normally be desired in order to achieve effective cooling. As such, the cooling is not as effective in these regions as other locations along the transition duct. In order to improve cooling to the transition duct, FIGS. 1 and 2 depict a gas turbine transition duct 100 in accordance with the prior art where a plurality of semi-hemispherical flow catching devices 102 are used to divert cooling air into a passageway 104 of the transition duct 100.

SUMMARY

The present invention provides embodiments for an apparatus and associated method for providing a cooling fluid to a gas turbine transition duct in order to lower the effective operating temperatures of the transition duct and improve durability of the transition duct. In an embodiment of the present invention a transition duct is disclosed having an inner liner and an impingement sleeve positioned radially outward of and surrounding the inner liner. The impingement sleeve has a plurality of openings where multiple openings each have a feed tube that has a portion extending therethrough. The feed tubes are oriented at an angle relative to the impingement sleeve, such that an inlet to the feed tube is directed generally towards an oncoming flow of a cooling fluid.

In an additional embodiment, a method of cooling a gas turbine transition duct is provided. The method comprises placing a plurality of feed tubes in at least a portion of a plurality of openings in an impingement sleeve such that an outlet of the feed tube is positioned within a passageway defined between an inner sleeve and the impingement sleeve. The feed tubes are fixed to the impingement sleeve such that a portion of a cooling fluid flow that passes along an outer surface of the impingement sleeve is directed through the plurality of feed tubes and at least partially towards the inner liner to cool the inner liner of the transition duct.

In yet another embodiment, a feed tube for a gas turbine transition duct is disclosed. The feed tube has a generally cylindrical portion with a tube inlet and a tube outlet. The tube inlet has a tube inlet diameter with a retaining device positioned about the tube inlet and the tube outlet has a tube outlet diameter. The feed tube is capable of being positioned within an opening in a transition duct outer wall in order to divert a portion of a cooling fluid into a transition duct passageway for active cooling of the transition duct.

Additional advantages and features of the present invention will be set forth in part in a description which follows, and in part will become apparent to those skilled in the art upon examination of the following, or may be learned from practice of the invention.

BRIEF DESCRIPTION OF THE SEVERAL VIEWS OF THE DRAWING

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms “step” and/or “block” may be used herein to connote different elements of methods employed, the terms should not be interpreted as implying any particular order among or between various steps herein disclosed unless and except when the order of individual steps is explicitly described.

Figure 3:
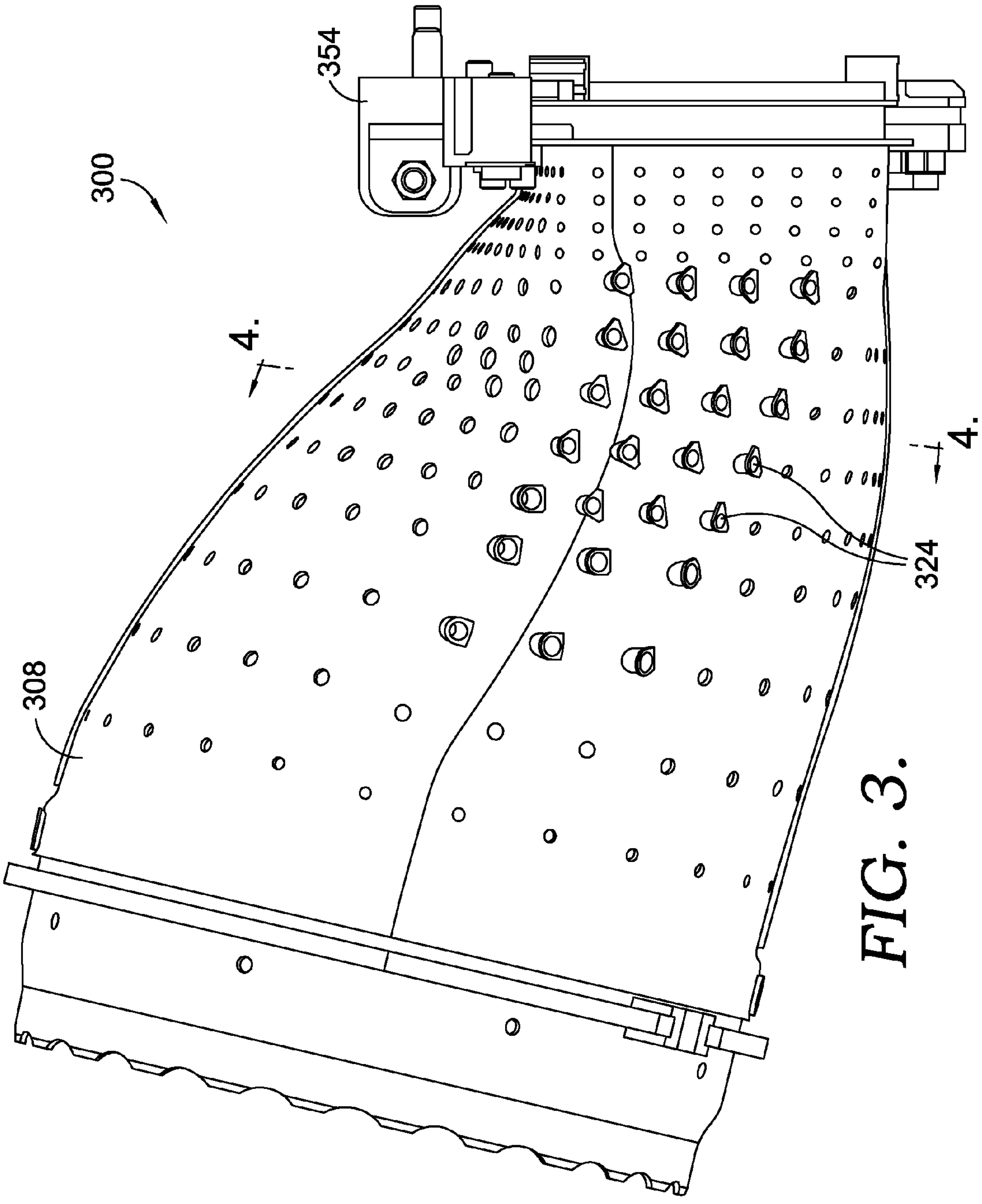
FIG. 3 depicts an elevation view of a gas turbine transition duct in accordance with an embodiment of the present invention.
Figure 4:
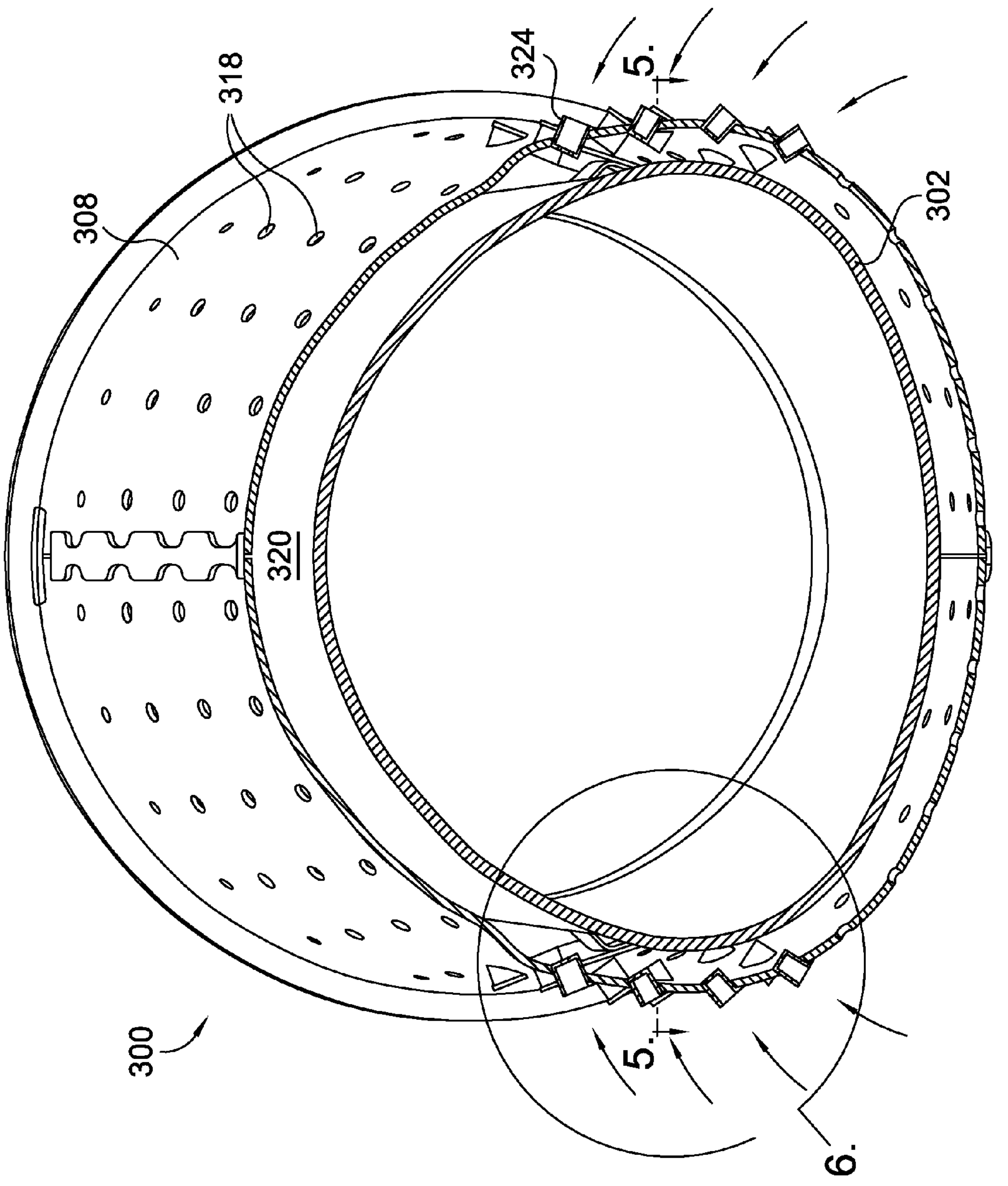
FIG. 4 depicts a cross section view of the gas turbine transition duct of FIG. 3 taken looking toward an inlet end of the transition duct in accordance with an embodiment of the present invention.
Figure 5:
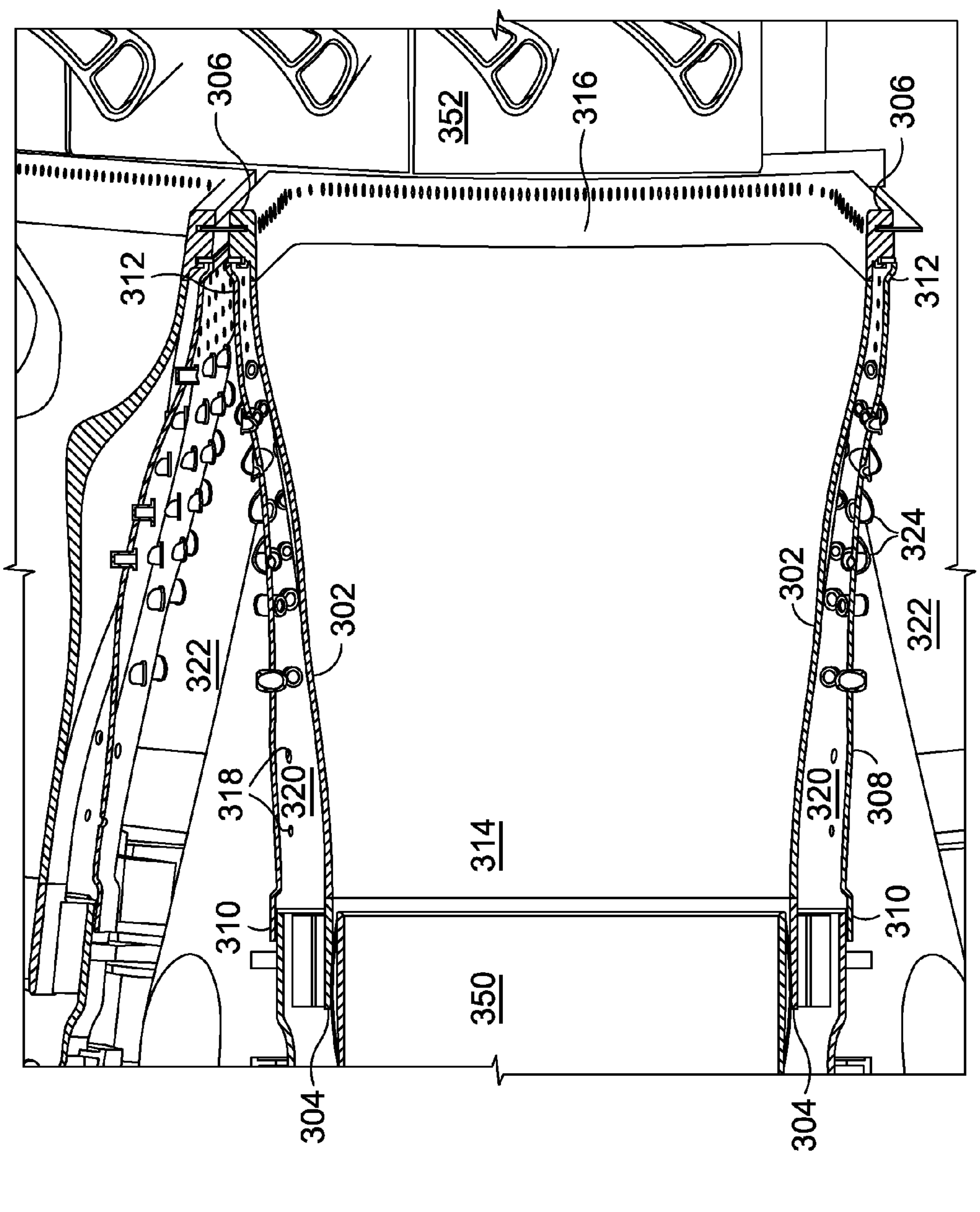
FIG. 5 depicts an alternate cross section view of the gas turbine transition duct of FIG. 3 in accordance with an embodiment of the present invention.

Referring initially to FIGS. 3-5, a transition duct 300 for a gas turbine combustor is depicted. The transition duct 300 comprises an inner liner 302 having a first liner end 304 and a second liner end 306. Encompassing the inner liner 302 is an outer wall or impingement sleeve 308. The impingement sleeve 308 is positioned radially outward of the inner liner 302 so as to encompass the inner liner 302 and has a first sleeve end 310 and a second sleeve end 312. For an embodiment of the present invention, the first liner end 304 and first sleeve end 310 are each generally cylindrical in shape while second liner end 306 and second sleeve end 312 are each generally arc-shaped rectangles. Such a change in geometry allows for the transition duct 300 to engage a combustion liner 350 at a first end 314 and engage a portion of a turbine inlet 352 at a second end 316. The position of the transition duct 300 relative to the combustion liner 350 and the turbine inlet 352 is depicted in FIG. 5. For the embodiment of the present invention shown in FIGS. 3-5, fourteen transition ducts 300 are utilized to direct all combustion gases to the turbine inlet 352. The transition ducts 300 are positioned equally about an engine centerline and direct combustion gases to a section of the turbine inlet 352. Each transition duct 300 also include a mounting bracket 354 or other equivalent structure that mounts the transition duct 300 to the turbine inlet 352. The mounting bracket 354 is typically bolted or fastened to a ring that supports and surrounds a set of vanes at the turbine inlet 352.

The transition duct 300 is fabricated from a high temperature alloy, such as Nimonic 263, which is designed to operate at elevated temperatures, under thermal and mechanical loading for an extended period of time. To reduce the impact of the elevated temperatures, often times a thermal barrier coating is applied to an inner wall of the inner liner 302, which is the surface that is directly exposed to the hot combustion gases. This coating, which typically comprises a bond coating applied to the base metal of the inner liner 302 and followed by a top coating applied over the bond coating, can vary in composition and thickness. In an embodiment of the present invention, the coating applied to the inner surface of inner liner 302 comprises approximately 0.010 inches of bond coating and approximately 0.025 inches of a ceramic top coating. However, this coating is not always sufficient in reducing the effective metal temperature of the transition duct 300 to a temperature low enough to prevent fatigue and failure of the transition duct. Details of hardware associated with active cooling of the transition duct 300 are discussed below.

The impingement sleeve 308 also comprises a plurality of openings 318. These openings 318 extend through the thickness of the impingement sleeve 308. The exact number of openings 318, their spacing, shape, and size depend on a variety of factors such as the size of the transition duct 300, a desired operating temperature range, and supply of cooling fluid. The plurality of openings 318 are designed to receive a cooling fluid, such as air, in order to cool the inner liner 302 of the transition duct 300. However, in some gas turbine engine configurations, the geometry of the transition duct 300 and the gas turbine engine to which the transition duct 300 is assembled, provide a very small region between adjacent transition ducts (see FIG. 5). For a given mass flow of cooling fluid provided to an environment around the transition duct 300, the velocity in a larger volume will tend to be slower compared to that of a smaller volume, such as the region between adjacent transition ducts near an inlet to the turbine (towards the second end 316 of the transition duct 300). As such, a smaller volume causes the air to pass through this region at a much higher velocity. Without any type of external aid, the cooling fluid is drawn into a passageway 320 by a pressure differential between the passageway 320 and an atmosphere 322 surrounding the impingement sleeve 308. As the cooling fluid enters the passageway 320 and travels from the second end 316 towards the first end 314, it loses pressure, and therefore, the passageway 320 maintains a lower pressure than the atmosphere 322 outside of the impingement sleeve 308.

The present invention provides assistance to direct a cooling fluid into the passageway 320 of the transition duct 300, especially where the velocity between adjacent transition ducts 300 prevent a sufficient supply of cooling fluid to enter the plurality of opening 314. The high velocity of the air between the transition ducts 300 results in a low static pressure approaching the pressure inside of the transition duct. Therefore, a portion of total pressure must be captured to direct cooling flow into the transition duct. For the present invention, this assistance is provided by one or more feed tubes 324 positioned through at least a portion of the plurality of openings 318. This positioning of the one or more feed tubes 324 is depicted in more detail in FIG. 6, with the feed tube 324 shown in greater detail in FIGS. 7-9. Specifically, the one or more feed tubes 324 have a generally cylindrical portion 326 that extends a tube length 328, and has a tube inlet 330 and a tube outlet 332.

The cylindrical portion 326 has an inner wall 334 and an outer wall 336 separated by a thickness 338. The tube length 328 can vary depending on the transition duct structure and the size of the passageway 320, which may be uniform or can vary in cross-sectional area. However, for the embodiment depicted in FIG. 9, the tube length 320 is approximately 1.2 inches. The one or more feed tubes 324 extend through the openings 318 such that a portion of the tubes extend into the passageway 320 and a portion remains external to the impingement sleeve 308.

Figure 8:
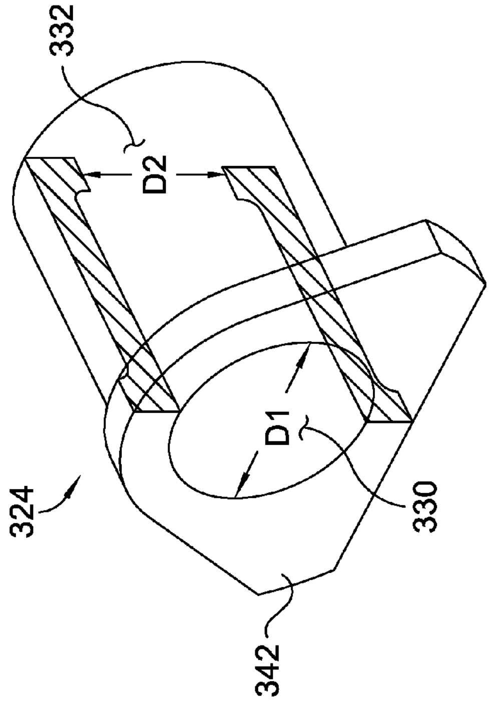
FIG. 8 depicts an alternate perspective view of the feed tube of FIG. 7 in accordance with an embodiment of the present invention; and, FIG. 9 depicts a cross section view in perspective of the feed tube of FIG. 7 in accordance with an embodiment of the present invention.
Figure 9:
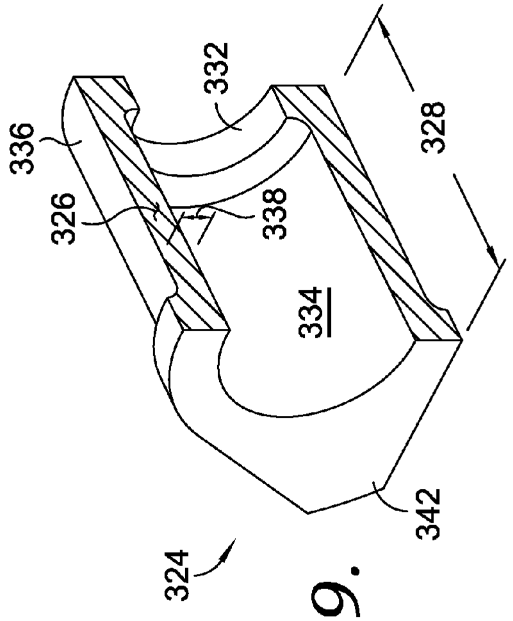

Referring specifically to FIGS. 8 and 9, it can be seen that the tube inlet 330 has a diameter D1 that is greater than a diameter D2 at the tube outlet 332. Having a smaller diameter at the tube outlet 332, provides a metering mechanism for a cooling fluid passing through the feed tube 324. As such, the diameter D2 can be determined based on the cooling requirements for a particular engine type, geographic location, or operating condition so as to provide a sufficient amount of cooling fluid to the passageway 320. The exact size of diameter D2 will depend on a variety of factors including desired cooling fluid penetration across the passageway 316, the number of feed tubes 318, and the amount of pressure loss desired across the tube outlet 324. More specifically, with diameter D2 being smaller than the diameter D1 and the feed tubes 324 initially being separate components, the feed tubes 324 can be sized and flow tested prior to assembly into the transition duct 300. If the feed tubes 324 are not flowing properly, the diameters D1 and D2 can be modified in a sub-assembly state to ensure proper flow characteristics.

Figure 6:
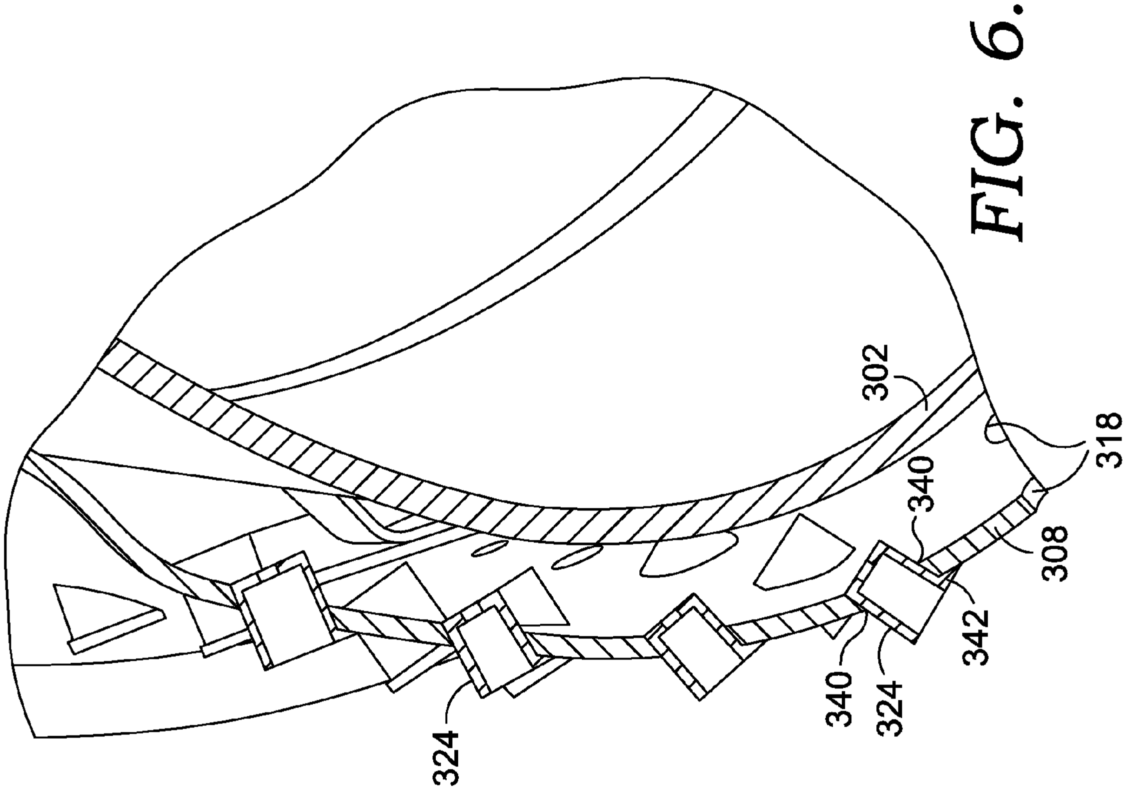
FIG. 6 depicts a detailed cross section view of a portion of the gas turbine transition duct of FIG. 4 in accordance with an embodiment of the present invention.

Referring back to FIGS. 4 and 6, the relationship between how the one or more feed tubes 324 are positioned relative to the transition duct 300 is shown in greater detail. The one or more feed tubes 324 are oriented at an angle relative to the impingement sleeve 308 such that the tube inlet 330 is directed generally towards an oncoming flow of cooling fluid. This is depicted in FIG. 4 where the arrows indicate the direction of the cooling fluid flow relative to the feed tubes 324. Positioning the tubes such that the tube inlet 330 is oriented to generally receive the oncoming cooling flow more effectively recovers a free stream pressure and ensures the maximum amount of cooling fluid enters the tube inlet 330. This also ensures a dynamic head pressure (the difference between total and static pressure) is capable of directing flow through the feed tubes 324. In order to maintain the feed tubes 324 in this position, the feed tubes 324 are permanently fixed to the impingement sleeve 308 at the opening 318. One such way to fix the feed tubes 324 to the impingement sleeve 308 is through welds 340, as shown in FIG. 6.

Figure 7:
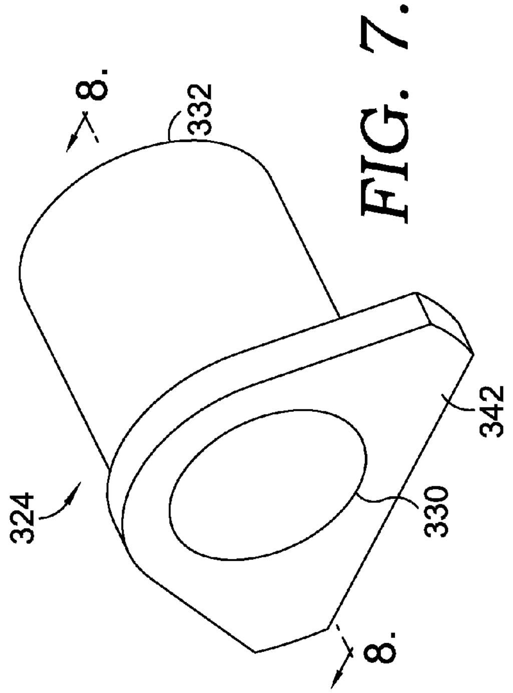
FIG. 7 depicts a perspective view of a feed tube in accordance with an embodiment of the present invention.

The one or more feed tubes 324 also have a retaining device 342 positioned about the tube inlet 330 that prevents the one or more feed tubes 324 from sliding into the passageway 320 should the one or more feed tubes 324 separate from the impingement sleeve 308. The retaining devices, which for the embodiment of the feed tubes 324 depicted in FIGS. 7-9, are generally D-shaped and are integral to the feed tubes 324. However, the shape of the retaining device 342 can be a variety of shapes as long as the size of the retaining device 342 is greater than the size of the opening 318 in the impingement sleeve 308. While the feed tube 324 has been discussed as a single-part construction, the feed tube 324 can also be an assembly where the retaining device 342 is fixed to the cylindrical portion 326. If a retaining device 342 is not utilized, then should the feed tube 324 separate from the impingement sleeve 308, as can occur with excessive vibrations during operation, the feed tube 324 can slide into the passageway 320, move towards the first end 314, possibly damaging the transition duct 300, blocking an opening 318 from receiving the cooling fluid, become lodged into the combustor, or causing even more damage by passing through the turbine.

Figure 1:
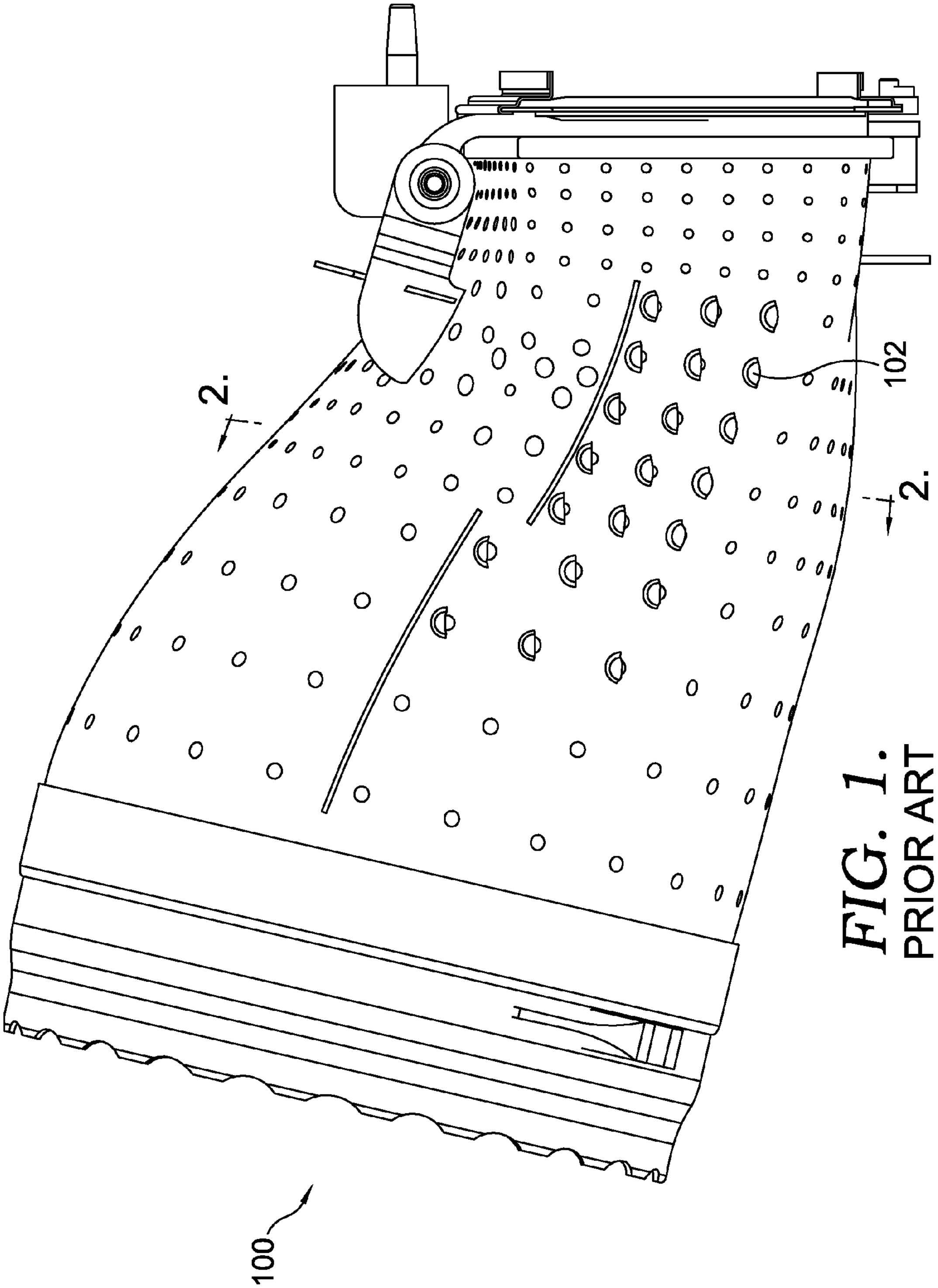
FIG. 1. PRIOR ART
FIG. 1 depicts an elevation view of a gas turbine transition duct of the prior art.
Figure 2:
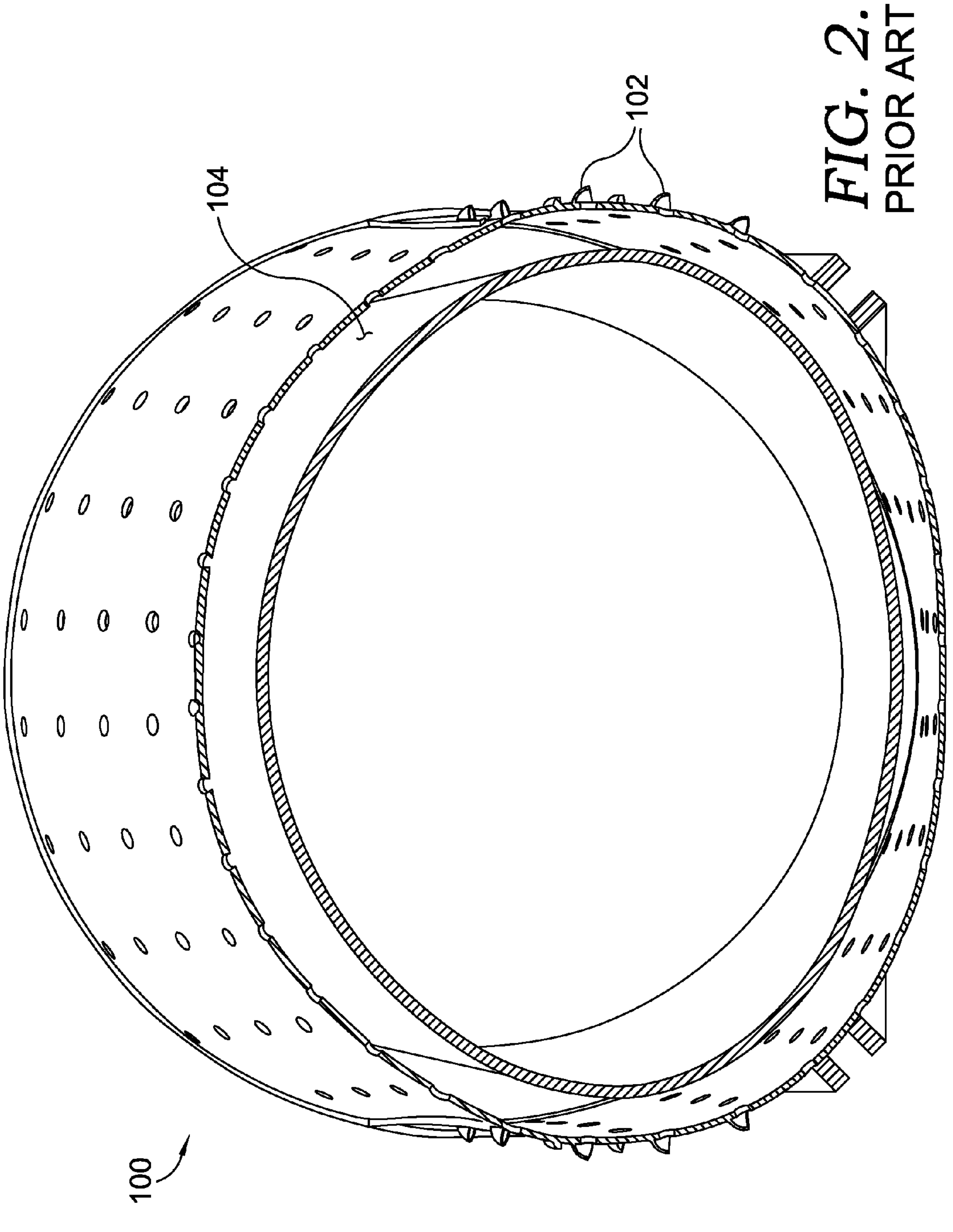
FIG. 2. PRIOR ART
FIG. 2 depicts a cross section view of the gas turbine transition duct of FIG. 1.

As previously discussed, the one or more feed tubes 324 direct a supply of cooling fluid towards the inner liner 302. The position of the one or more feed tubes 324 can be customized in terms or surface angle or penetration depth as desired so as to affect the direction of cooling fluid and penetration of the cooling fluid across the air flow moving through the passageway 320. The cooling fluid passing through the feed tubes 324 provides a “footprint” on the inner liner 302, which is essentially a square area that is directly impacted by the cooling fluid coming from the opening 318. For an embodiment of the present invention, the footprint provided by the feed tubes 324 is approximately 0.85 $in^2$, which is nearly 8% larger than a footprint provided by the prior art design which is depicted in FIGS. 1 and 2. This improved cooling scheme on the inner liner 302 is accomplished using approximately 0.8% less cooling air than the prior art transition duct.

Another advantage of the feed tubes 324 over the prior art is with respect to the cooling fluid supply pressure. From analytical testing, it has been determined that the total pressure loss through the feed tubes 324 is approximately 0.2% less than that caused by the semi-hemispherical flow catching devices of the prior art. This smaller pressure loss across the feed tubes 324 translates into a higher supply pressure of compressed air to the combustion system, which results in a more efficient combustion process.

The present invention also provides a method of cooling a gas turbine transition duct. A gas turbine transition duct as described herein has an inner liner and an impingement sleeve encompassing the inner liner so as to establish a passageway between the inner liner and the impingement sleeve. A plurality of feed tubes are provided and are placed in at least a portion of the openings with the tube outlets located in the passageway. The plurality of feed tubes can be individually flow tested to ensure the desired flow rates are achieved prior to assembly with the impingement sleeve. If necessary, inlet and/or outlet diameters of the feed tubes can be modified. The tubes are then fixed to the impingement sleeve.

In operation, a cooling fluid, such as air, is directed along an outer surface of the impingement sleeve. Due to the orientation of the feed tubes, a portion of the cooling fluid is directed through the plurality of feed tubes and at least partially towards the inner liner, so as to cool the inner liner of the transition duct. In an embodiment of the present invention, the cooling fluid exits the feed tubes, into the passageway, and passes from the second end of the transition duct to the first end of the transition duct. From the passageway of the transition duct, the cooling fluid, is then directed to the combustor region where it is used to cool a liner portion of the combustor before being mixed with fuel for combustion.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. An assembly of transition ducts for a gas turbine engine, each transition duct comprising:

an inner liner having a first liner end and a second liner end;

an impingement sleeve positioned radially outward of an encompassing the inner liner and having a first sleeve end, a second sleeve end, and a plurality of openings;

a plurality of feed tubes positioned through at least a portion of the plurality of openings, the feed tubes are configured with a tube length, the tube length having a tube inlet and a tube outlet, wherein the feed tubes extend into a passageway formed between the inner liner and the impingement sleeve;

a plurality of retaining devices having at least one extending portion extending outward from the tube inlet of the feed tubes, respectively, wherein the at least one extending portion of the plurality of retaining devices prevents the feed tubes, respectively, from sliding into the passageway, wherein the contact between the at least one extending portion and the impingement sleeve fixedly retain the feed tubes within the impingement sleeve at a plurality of surface angles, respectively, and wherein the plurality of surface angles are generally established by the retaining devices, respectively, to receive oncoming cooling flow; and a mounting bracket, wherein the transition ducts are mounted adjacent to each other with gaps therebetween, such that the plurality of feed tubes are positioned to extend into the gaps so as to locally capture additional cooking air for increasing air pressure in the passageway.

2. The transition duct of claim 1, wherein the inner liner further comprises a thermal barrier coating.

3. The transition duct of claim 1, wherein the first liner end and first sleeve end are generally cylindrical and the second liner end and second sleeve end are generally arc-shaped rectangles.

4. The transition duct of claim 3, wherein the passageway varies in cross-sectional area from the second end to the first end.

5. The transition duct of claim 1, wherein a cross-sectional, radially measured, inner diameter of the tube inlet is greater than a cross-sectional, radially measured, inner diameter of the tube outlet.

6. The transition duct of claim 1, wherein the plurality of feed tubes are oriented at an angle relative to the impingement sleeve such that the tube inlet is directed generally towards an oncoming flow of cooling fluid.

7. The transition duct of claim 1, wherein the plurality of feed tubes are permanently fixed to the impingement sleeve of the transition duct.

8. A feed tube for a gas turbine transition duct comprising:

a generally cylindrical portion having a tube inlet and a tube outlet located at opposed ends of a tube length and oriented in parallel-spaced relation, the cylindrical portion is provided with an inner wall, an outer wall, and a thickness therebetween, a cross-sectional, radially measured, inner diameter of the tube inlet is greater than a cross-sectional, radially measured, inner diameter of the tube outlet, wherein the feed tube is capable of being positioned within an opening of a transition duct outer wall and extending into an atmosphere region between adjacent transition ducts; and a retaining device having a extending portion extending outward from the tube inlet of the feed tube, respectively, wherein the extending portion of the retaining device prevents the feed tube, respectively, from sliding into the passageway, wherein the contact between the extending portion and the transition duct outer wall fixedly retain the feed tube within the transition duct outer wall at a plurality of surface angles, respectively, and wherein the plurality of surface angles are generally established by the retaining device, respectively, to receive oncoming cooling flow.

9. The feed tube of claim 8, wherein the feed tube is fixed to the transition duct outer wall.

10. The feed tube of claim 9, wherein the feed tube outlet extends into the passageway.

11. The feed tube of claim 8, wherein the retaining device is generally D-shaped.

12. A transition duct of a gas turbine engine, the transition duct comprising:

an inner liner for directing hot combustion gas from a combustor to a turbine;

an impingement sleeve radially encompassing the inner liner to form a passageway, wherein the impingement sleeve is formed with a plurality of openings, and wherein the passageway varies in cross-sectional area from a first end to a second end thereof;

a plurality of feed tubes positioned through at least a portion of the plurality of openings, respectively, the feed tubes configured with a tube length, the tube length having a tube inlet and a tube outlet, wherein the feed tubes extend into a passageway at respective penetration depths, wherein the penetration depths vary in length across the feed tubes in accordance with the variation in cross-sectional area of the passageway; and a plurality of retaining devices having a extending portion extending outward from the tube inlet of the feed tubes, respectively, wherein the extending portion of the retaining devices prevents the feed tubes, respectively, from sliding into the passageway, wherein the contact between the extending portion and the impingement sleeve fixedly retain the feed tube within the impingement sleeve at a plurality of surface angles, respectively, and wherein the plurality of surface angles are generally established by the retaining device, respectively, to receive oncoming cooling flow.

13. The transition duct of claim 4, wherein the surface angles of the feed tubes with respect to the impingement sleeve vary in degree across the feed tubes in accordance with the variation in cross-sectional area of the passageway.

* * * * *